Patented Nov. 26, 1935

2,021,910

UNITED STATES PATENT OFFICE 2,021,910

PREPARATION OF CALCIUM SULPHATE

Sydney Francis William Crundall, Manchester, England, assignor to Peter Spence & Sons, Limited, Manchester, England No Drawing. Application June 10, 1929, Serial No. 369,932. Renewed May 15, 1934. In Great Britain June 14, 1928

6 Claims. (Cl. 23—122)

This invention has reference to the preparation of calcium sulphate.

It is known that calcium sulphate may be obtained either naturally or artificially in a number of forms, e. g., as gypsum or hydrated calcium sulphate, $CaSO_4 2H_2O$, as plaster of Paris or hemihydrate $CaSO_4 \frac{1}{2} H_2O$, or anhydrous sulphate in "soluble" and "insoluble" forms. It is also known that crystalline anhydrate is the stable form of calcium sulphate in the presence of concentrated sulphuric acid. The texture of these products, whether produced artificially or in their natural state, is normally coarse and open even after fine grinding and renders them generally unfit for certain purposes such, for example, as many for which barium sulphate is used.

I have now found methods by which calcium sulphate products may be obtained in an extremely finely divided and apparently amorphous form as insoluble anhydrous sulphate. The described products have an extremely fine texture which renders them much more suitable for many purposes in the arts than, for example, terra alba.

My invention consists in the treatment of hydrated forms of calcium sulphate, suitably the hydrated form $CaSO_4 2H_2O$ either in the form of native mineral, e. g., as gypsum, or prepared artificially, e. g., by combination or precipitation, with sulphuric acid in such quantities and of such concentrations that do not result in solution of the calcium sulphate or the formation of soluble acid calcium sulphates and which give a final strength of the acid after incorporation of the combined water of hydration of below about 1.8 sp. gr. and above about 1.3 sp. gr.

The temperatures which may be suitably employed may vary according to the nature and concentration of the dehydrating agent used and the physical condition of the hydrated calcium sulphate—in some cases ordinary or low temperatures may be employed but generally under such conditions disintegration and dehydration take longer time to effect. When employing sulphuric acid as the dehydrating agent it may be used at a suitable strength, e. g., a specific gravity of about 1.6, or it may be brought to the required strength during the operation, e. g., by the application of heat, by dilution etc.

Thus, for example, I may mix the hydrate $CaSO_4 2H_2O$ in powder form or, if desired, made into a paste with a limited amount of diluted acid, with sulphuric acid of, e. g., 1.75 sp. gr. (at 15° C.) and maintain it at about 130° C. with agitation until dehydration and disintegration are effected, wash the extremely finely divided and disintegrated anhydrous $CaSO_4$ free from acid, and dry, or dry and calcine. Or, I may intimately mix together the crushed or powdered hydrated calcium sulphate and say 30% of its weight of sulphuric acid of suitable strength, e. g., 1.7 sp. gr. at 15° C., and gradually heat the mixture to about 140° C., and after cooling, wash and dry as just described. Or, I may intimately mix together the hydrated calcium sulphate in crushed or powder form, and sulphuric acid of suitable strength, e. g., about 1.7 sp. gr. at 15° C., and allow the mixture to stand at ordinary temperatures for some days and thereafter separate the acid by known means. Or, I may intimately mix together the hydrated calcium sulphate and say 15% of its weight of sulphuric acid of suitable strength, e. g., about 1.84 sp. gr. at 15° C., raise the temperature of the mass to about 100° C. and maintain it at about this temperature until dehydration and disintegration are effected. Or, I may intimately mix together the hydrated calcium sulphate and say 18% of its weight of sulphuric acid containing an excess of sulphur trioxide (fuming sulphuric acid) of a strength known commercially as 66% oleum, and allow the mixture to stand at ordinary temperatures for some days and then separate the acid by known means. Or, I may mix the hydrate and sulphuric acid of suitable strength and heat and then calcine the mixture and so effect the desired dehydration and also drive off the sulphuric acid used. In all cases, however, the strengths, concentrations and quantities of sulphuric acid employed must be such as will not result in the solution of the calcium sulphate and/or formation of soluble acid calcium sulphates in substantial amounts.

If the hemi-hydrate, prepared by known means, is employed as the source of hydrated calcium sulphate I may, although it is not essential, employ such conditions for its conversion to the desired dehydrated and disintegrated form as will prevent its further hydration before such conversion. Generally, however, I prefer to use the dihydrate $CaSO_4 2H_2O$ as obtained naturally in the form of gypsum.

In general, I may operate under such conditions of temperature and/or concentration of the dehydrating agent and of time as will most suitably effect the desired dehydration and disintegration of the original structural form of the hydrated calcium sulphate. A quantity of sulphuric acid in excess of the minimum required to effect dehydration is preferred to ensure the desired completeness of disintegration. Although the final strength of sulphuric acid, after effecting dehydration, may be as low as about 1.3 sp. gr. I prefer to operate under such conditions as give a final strength of at least 1.4 sp. gr. or higher.

In place of sulphuric acid as the dehydrating agent, I may employ dry sulphur trioxide, which may be passed in dry form over the hydrated calcium sulphate in quantity sufficient to give with the water of hydration the desired concentration of acid.

Although the described finely divided anhydrous form of calcium sulphate will rehydrate slowly, the ordinary technical operations of washing, separating, drying etc. may be effected without difficulty. In cases in which impure forms of hydrated calcium sulphate are used, impurities soluble in the dehydrating agent employed, e. g., iron compounds in sulphuric acid, are concurrently removed and to this extent purification may be effected during the process. In cases where the colour is poor owing to naturally occurring organic impurities, this may be improved by calcination.

I am aware that the preparation of calcium sulphate anhydride has been described in chemical literature by Van't Hoff and others by treatment of hydrated forms of calcium sulphate with solutions of, e. g., NaCl, $CaCl_2$ and other substances, but it is not possible to obtain by previously described methods the effective dehydration and physical breakdown and change of the structure of the treated hydrated sulphate which can be obtained by the means now described and which constitute a technical advance of importance.

What I claim as my invention and desire to secure by Letters Patent is:—

1. The process for the production of anhydrous calcium sulphate in an extremely finely divided and amorphous form, which process comprises treating hydrated forms of calcium sulphate with fuming sulphuric acid for removing the combined water from and effecting the disintegration of the original structural form of the hydrated calcium sulphate.

2. The process for the production of anhydrous calcium sulphate in an extremely finely divided and amorphous form, which process comprises treating hydrated forms of calcium sulphate with sulphur trioxide for removing the combined water from and effecting the disintegration of the original structural form of the hydrated calcium sulphate.

3. The process for the production of anhydrous calcium sulphate in an extremely finely divided and amorphous form, which process consists in treating hydrated forms of calcium sulphate with substantiallly 30% of its weight of sulphuric acid and gradually heating the mixture of the hydrated calcium sulphate and sulphuric acid to a temperature of approximately 140° C.

4. The process for the production of anhydrous calcium sulphate in an extremely finely divided and amorphous form, which process comprises treating hydrated forms of calcium sulphate with sulphuric acid for removing the combined water from and effecting the disintegration of the original structural form of the hydrated calcium sulphate, the quantity and concentration of the sulphuric acid being such that the calcium sulphate does not enter into solution and no soluble acid caleium sulphate is formed.

5. The process for the production of anhydrous calcium sulphate in an extremely finely divided and amorphous form, which process comprises treating hydrated forms of calcium sulphate with sulphuric acid for removing the combined water from and effecting the disintegration of the original structural form of the hydrated calcium sulphate, the quantity and concentration of the sulphuric acid being such that the calcium sulphate does not enter into solution and no soluble acid calcium sulphate is formed, and the specific gravity of the acid after incorporation of the water of hydration is not less than 1.3.

6. The process for the production of anhydrous calcium sulphate in an extremely finely divided and amorphous form, which process comprises treating hydrated forms of calcium sulphate with sulphuric acid having a specific gravity of less than 1.85, the quantity of sulphuric acid being such that the specific gravity of the acid after incorporation of the water of hydration is not less than 1.3.

SYDNEY FRANCIS WILLIAM CRUNDALL.